United States Patent [19]

Arzoumanidis et al.

[11] 4,324,693

[45] Apr. 13, 1982

[54] OLEFIN POLYMERIZATION CATALYST

[75] Inventors: Gregory G. Arzoumanidis, Naperville; Sam S. Lee, Hoffman Estates, both of Ill.

[73] Assignee: Standard Oil Company (Indiana)

[21] Appl. No.: 196,012

[22] Filed: Oct. 10, 1980

[51] Int. Cl.$^3$ .............................................. C08F 4/64
[52] U.S. Cl. ................................ 252/429 B; 526/142
[58] Field of Search ..................................... 252/429 B

[56] References Cited

FOREIGN PATENT DOCUMENTS 11914 6/1980 European Pat. Off. .

*Primary Examiner*—Patrick Garvin
*Attorney, Agent, or Firm*—Wallace L. Oliver; William T. McClain; William H. Magidson

[57] ABSTRACT

In a method to produce an alpha-olefin polymerization catalyst comprising reducing titanium tetrachloride with an aluminum alkyl, contacting the resulting reduced solid with a pretreatment amount of alpha-olefin monomer under polymerization conditions and reacting the resulting product with a Lewis base complexing agent and additional titanium tetrachloride, the improvement comprising reacting the Lewis base complexing agent in a molar ratio to the reduced titanium compound of greater than 1.15 to 1.

16 Claims, No Drawings

OLEFIN POLYMERIZATION CATALYST

BACKGROUND OF THE INVENTION

This invention relates to olefin polymerization catalysts and more particularly to improved catalysts for the polymerization of propylene and higher alphaolefins.

Olefin polymerization catalysts based on transition metal compounds and aluminum alkyls are well known in the art. Particularly, the use of titanium trihalide compounds to produce crystalline propylene polymers have been reported widely. Among recently published catalytic systems based on titanium trihalides are U.S. Pat. Nos. 3,984,350; 4,210,738; 4,210,729; 4,210,736; and European patent application No. 79301996.9 published as U.S. No. 0 011 914 based on U.S. Ser. No. 945,929 filed Sept. 26, 1978; all of these references are incorporated herein by reference.

U.S. Pat. No. 4,210,738 describes a titanium halide-based catalyst in the delta crystalline form and having a color tending toward violet made by reducing titanium tetrachloride with an aluminum alkyl, treating the reduced solid with an ether, thioether or thiol complexing agent and reacting with additional titanium tetrachloride.

U.S. Pat. No. 4,210,729 describes a method to preactivate the catalyst described in U.S. Pat. No. 4,210,738 with a metal organic compound of Groups I$a$, II$a$, II$b$, or III$a$.

U.S. Pat. No. 4,210,736 describes catalysts such as those listed in U.S. Pat. No. 4,210,738 which have been dried.

U.S. Pat. No. 3,984,350 describes a highly catalytically active titanium trihalide composition in the beta crystalline form having a brown color formed by reducing titanium tetrachloride with an aluminum alkyl and reacting, under controlled conditions, the resulting reduced product with a complexing agent and additional titanium tetrachloride.

European patent application Publication No. 0 011 914 describes a method to treat a catalyst such as described in the above-cited U.S. Patents with olefin monomer such that the resulting catalyst particle is non-friable. The method disclosed in the European Patent Application comprises contacting a reduced titanium trihalide composition with olefin monomer, such as propylene, before reacting with a Lewis base complexing agent and either titanium tetrachloride or a chlorinated hydrocarbon.

Catalysts prepared according to the above-cited references generally are active propylene polymerization catalysts. However, there is a need to increase the activity of such catalysts, while maintaining their ability to produce highly crystalline polymer, for use in advanced polymerization processes such as the gas phase olefin polymerization process. The invention disclosed herein produces a significantly more active alpha-olefin polymerization catalyst.

SUMMARY OF THE INVENTION

In a method to produce an alpha-olefin polymerization catalyst comprising reducing titanium tetrachloride with an aluminum alkyl, contacting the resulting reduced solid with a pretreatment amount of alpha-olefin monomer under polymerization conditions and reacting the resulting product with a Lewis base complexing agent and additional titanium tetrachloride, the improvement comprising reacting the Lewis base complexing agent in a molar ratio to the reduced titanium compound of greater than 1.15 to 1.

BRIEF DESCRIPTION OF THE INVENTION

In aluminum alkyl reduced titanium trihalide donor complexes which have been prepolymerized with an olefin monomer, such as propylene, it has been found that olefin polymerization activity can be increased significantly by using molar excess of Lewis base (electron donor) complexing agent with respect to titanium tetrahalide starting material.

The first step in preparing catalysts of this invention is reducing titanium tetrahalide, preferably titanium tetrachloride and typically dissolved in an inert hydrocarbon diluent, with an organoaluminum compound at a temperature of about $-50°$ C. to about $30°$ C., preferably about $-30°$ C. to about $0°$ C. The resulting slurry may be heated to about $50°-100°$ C. for a period of up to a few hours.

Organoaluminum compounds useful as reducing agents include alkyl aluminum compounds with a general formula $R_nAlX_{3-n}$ where R is an alkyl group having 1 to about 10 carbon atoms, X is a halogen, preferably chloride, n is greater than 0 and less than or equal to 3. Examples of suitable alkyl aluminum compounds are trialkyl aluminum, dialkyl aluminum halide, alkyl aluminum dihalides, alkyl aluminum sesquihalides and mixtures thereof. Preferably reducing compounds are diethyl aluminum chloride and ethyl aluminum sesquichloride.

Diluents useful in this invention include organic liquids substantially inert under the conditions used and include alkanes such as pentane, hexane, cyclohexane and the like.

Typically, the organoaluminum reducing agent in a hydrocarbon diluent is added, usually dropwise, to a cold solution of titanium tetrachloride in a suitable diluent with agitation. The resulting slurry preferably is heated to $50°-100°$ C. for a few hours. The molar amount of organoaluminum compound to titanium tetrachloride can vary from about 0.5 to 1 to over 2 to 1 and preferably about 0.75 to 1 to about 1.5 to 1.

Adequate agitation is necessary to form catalyst particles with the desired particle size distribution. Proper agitation can depend on speed of an impeller, reactor configuration and point of addition of reactants.

The resulting solid contains titanium trichloride in the beta crystalline form according to the generally adopted classification (Journal of Polymer Chemistry, 51, 1961, pp. 399-410). According to this invention such titanium trichloride-organoaluminum complex is contacted with a polymerizable alpha-olefin under polymerization conditions either with or without separating and washing the solid material. If separated suitable amounts of alkyl aluminum co-catalyst may be added during this prepolymerization procedure.

Alpha-olefins useful in the prepolymerization (pretreatment) procedure can contain from 3 to about 22 carbon atoms, preferably 3 to about 8 carbon atoms, and most preferably is propylene. Other suitable alpha-olefins include butene-1, pentene-1, hexene-1, heptene-1, 4-methyl-pentene-1. Typically suitable alpha-olefins contain no branching on the vinylic carbon atom.

The temperature for the prepolymerization procedure can range from about $0°$ C. to about $100°$ C. and preferably is about $35°$ C. to about $65°$ C.

The pretreatment amount of polymerized alpha-olefin contained on the titanium trihalide compound can range from about 1 to about 1000 wt.%, preferably about 3 to about 100 wt.% and most preferably about 6 to about 30 wt.% based on the weight of titanium trihalide complex.

Typically, after the prepolymerization procedure is completed, the resulting product is separated and washed with a hydrocarbon solvent. The prepolymerized titanium halide complex can be considered as either encapsulated with a coating of polymer or a titanium halide complex incorporated within a matrix of polymer.

According to this invention the prepolymerized product is reacted further with a Lewis base complexing agent and a Lewis acid compound.

The prepolymerized product, typically in a hydrocarbon diluent, is treated with a Lewis base, i.e., an electron pair donor compound, such as an ether, thioether, thiol or ketone, or mixtures thereof. Examples of suitable Lewis base complexing agents are lower (2 to 8 carbon atoms) alkyl ethers such as n-butyl, isobutyl, cyclohexyl, isoamyl, octyldiphenyl, isobutylisoamyl, and isopentylphenyl ethers. Preferable ether complexing agents are isoamyl and n-butyl ethers. Most preferred is a combination of n-butyl and isoamyl ethers in a molar ratio of about 1:3 to about 3:1, preferably about 1:2.

Generally, the Lewis base complexing agent is added to a hydrocarbon slurry of prepolymerized titanium halide product at ambient temperature to about 100° C. Subsequent to or in conjunction with treatment with Lewis base, the prepolymerized product is reacted further with a Lewis acid (electron pair acceptor) compound such as titanium tetrachloride. Other Lewis acid compounds include Groups IVb, IVa, and Va halides and oxyhalides. The molar ratio of Lewis acid to prepolymerized titanium halide can range from about 10:1 to 0.5:1 and preferably from about 3:1 to about 1:1.

An important consideration in preparing superior catalyst is control of the morphology of the catalyst particles. It has been found that catalysts of this invention should have a substantially spherical shape and have average particle sizes between about 20 and about 45 microns. By "average particle size" it is meant that 90% of all particles have diameters within 15% of such average size. This average is determined from photomicrographs of catalyst particles using well-established statistical techniques. A preferable catalyst has an average particle size between about 25 and about 40 microns and most preferably between about 30 and 35 microns. A good morphology of catalyst particles is necessary for a good morphology of resulting polymer particles. Thus very small particles (fines) and agglomerated particles should be avoided. Generally, particle size can be controlled by the extent of agitation used; increased agitation produces smaller particles.

As described in U.S. Pat. Nos. 3,984,350 and 4,210,738 the crystalline structure of the final product can be either the delta or an active beta form. To form the active beta form the temperature in the activation step is maintained preferably at about 40° C. to about 70° C. for a limited time while the concentration of the Lewis acid compound in a hydrocarbon diluent is about 10 to about 30 wt.%. Use of Lewis acid solutions above about 30 wt.% generally produce a titanium trihalide product in the delta crystalline form.

In place of a Lewis acid reactant, chlorinated hydrocarbon compounds can be used such as hexachloroethane, pentachloroethane, trichloropentane and the like. Typically such chlorinated hydrocarbons contain 1 to about 8 carbon atoms and 2 to about 6 chlorine atoms per molecule.

The essential element of this invention is the use of a molar excess of Lewis base complexing agent. The above-cited prior art indicates that although the molar ratio of Lewis base to titanium compound can range from 0.1:1 to 2.5:1, a molar ratio of about 1 to 1 is preferred. We have made the surprizing discovery that under the conditions described herein better polymerization activity is realized if the molar ratio of Lewis base to titanium compound is between about 1.15 to 1 to about 1.5 to 1, preferably between about 1.25 to 1 to about 1.35 to 1. Typically not only does the polymerization activity of such a catalyst of this invention increase, but typically the amount of amorphous polymer formed decreases.

The chemically activated pretreated titanium halide catalyst component described in this invention can be used in conjunction with an organoaluminum compound as a catalyst system to polymerize alpha-olefins, such as propylene, butene-1, and 4-methylpentene-1. This catalyst system is most useful to polymerize propylene or a mixture of propylene and a minor amount of ethylene or other copolymerizable alpha-olefins to a polymer containing a substantial crystalline content.

Organoaluminum compounds useful in the aforementioned catalyst systems include trialkylaluminum, dialkylaluminum halides, mixtures of trialkylaluminum with dialkylaluminum halides and mixtures of trialkylaluminum with alkylaluminum dihalides. Also catalytic effective amounts of mixtures of trialkylaluminum and dialkylaluminum halides can be used in conjunction with alkyl aluminum dihalides. Useful halides include bromides and chlorides and useful alkyl radicals contain from two to about six carbon atoms. The preferable halide is chloride and the preferable alkyl radical is ethyl. Diethylaluminum chloride (DEAC) is most preferable in propylene polymerizations. In a trialkylaluminum-dialkylaluminum halide mixture, the preferred amount of trialkylaluminum is about 20 to 50 mol percent. In a trialkylaluminum-alkylaluminum dihalide mixture, the preferred amount of trialkylaluminum is about 30 to 70 mol percent and most preferably about 40 to 60 mol percent.

The molar ratio of chemically activated pretreated titanium halide to organoaluminum compound in a catalyst system can range from about one-tenth to about 10, typically is about 1 to 6. The amount of catalyst in a polymerization depends on the reactor size and type and on the amount and type of olefin monomer and is known to the skilled artisan.

Catalyst additives such as disclosed in U.S. Pat. Nos. 3,950,268 and 4,072,809, incorporated herein by reference, can be added in minor amounts. Examples of catalyst modifiers include alkyl silicates, orthosilicate esters, esters, Lewis bases such as phosphines, phosphites, phosphates, phosphine oxides, aromatic amines, amine oxides, tertiary aliphatic amines and ethers or an organometallic chalcogenide such as bis(trialkyl)tin sulfide. These additional additives can be present in minor amounts ranging from about one-tenth to 30 mol percent and preferably about 1 to 20 mol percent of the transition metal halide in the catalyst system.

Since the catalyst systems used in this invention are sensitive to oxygen and moisture, suitable precaustions should be taken during catalyst preparation, transfer and use.

The catalyst system described in this invention can be used to polymerize alpha-olefins dissolved or suspended in liquid paraffinic medium, dissolved in liquid monomer, or in the gas phase.

Polymerization processes employing this invention can be practiced at pressures ranging from about atmospheric to about 20,000 psig and preferably from about 30 to 1000 psig.

Polymerization time depends on the process used. In batch processes the polymerization contact time usually is about one-half to several hours and in autoclave processes typically is one to four hours. In a continuous process, contact time in the polymerization zone is controlled as required and typically ranges from about one-half to several hours. Since in this type of process unreacted monomer continuously can be recycled into the polymerization zone, the contact time can be shorter than in a batch process.

Liquid organic solvents used in the slurry polymerization technique include aliphatic alkanes and cycloalkanes such as pentane, hexane, heptane or cyclohexane; a hydrogenated aromatic compound such as tetrahydronaphthalene or decahydronaphthalene; a high molecular weight liquid paraffin or mixtures of paraffins which are liquid at the reaction temperature; an aromatic hydrocarbon such as benzene, toluene or xylene; or a haloaromatic compound such as chlorobenzene, chloronaphthalene or o-dichlorobenzene. Other suitable solvents include ethylbenzene, isopropylbenzene, ethyltoluene, n-propylbenzene, diethylbenzenes, mono- and di-alkylnaphthalenes, n-pentane, n-octane, isooctane and methyl cyclohexane. Preferably, liquid hydrocarbons are used; most preferably, n-hexane is the polymerization medium. Although the nature of the solvent can be varied considerably, the solvent should be liquid under the reaction conditions and should be relatively inert. Advantageously, the solvent used can be purified prior to use by distillation, by reaction with an aluminum alkyl, or adsorption with molecular sieves.

The polymerization temperature depends upon the specific catalyst system used and can range from below about 0° C. to about 120° C. However, at temperatures below about 0° C. the polymerization rate slows and reactor residence times become unreasonably long, while at temperatures above about 120° C. the polymerization rate is too high which results in excessive amounts of n-hexane-soluble products. Preferably, the temperature ranges from about 2° C. to about 95° C. and most preferably from about 50° C. to about 80° C.

Gas phase reactor systems include both stirred bed reactors and fluidized bed reactor systems. Examples of such reactor systems are described in U.S. Pat. Nos. 3,957,448; 3,965,083; 3,971,768; 3,970,611; 4,129,701; 4,101,289; 3,652,527; and 4,003,712 all incorporated by reference herein. Typical gas phase olefin polymerization reactor systems comprise a reactor vessel to which olefin monomer and catalyst components can be added and which contain a bed of forming polymer particles. Typically, catalyst components are added together or separately through one or more valve-controlled ports in the reactor vessel. Olefin monomer, typically, is provided to the reactor through a recycle gas system in which unreacted monomer removed as off-gas and fresh feed monomer are mixed and injected into the reactor vessel. A quench liquid can be added to polymerizing olefin in order to control temperature.

This invention is useful in polymerizing propylene to a normally solid, substantially crystalline polymer, although propylene also can be polymerized with minor amounts up to about 30 wt.% of ethylene or other co-polymerizable alpha-olefins containing up to 10 carbon atoms to form random, pure-block, terminal block and multisegment copolymers.

The normally-solid propylene polymers prepared according to this invention have molecular weights ranging from about 50,000 to 5,000,000 and typically range from about 200,000 to 2,000,000. The molecular weights of such propylene polymers can be controlled by methods known to the art, such as by polymerizing in the presence of hydrogen in an amount determined by melt flow rate or by the molecular weight distribution desired.

This invention is demonstrated but not limited by the following examples.

EXAMPLE I

A titanium-containing catalyst component was prepared by reducing 105 grams of titanium tetrachloride in 168 grams of n-hexane cooled to $-7°$ C. in a vigorously stirred one-liter nitrogen-purged autoclave reactor with 71 grams of diethylaluminum chloride in 213 grams of n-hexane added dropwise over four hours. The temperature was maintained at $-7°$ C. for an additional 15 minutes, raised to 65° C. within one hour, maintained at 65° C. for two hours. After cooling slightly, the reactor was vented to 1 psig, 24 grams of propylene were admitted slowly. After about 45 minutes, the reactor was vented and flushed several times with nitrogen. The resulting solid product was washed seven times with 225-milliliter portions of n-hexane. The average particle size of such product was 22.5±3 microns. The supernatant liquid from the last wash was decanted and 400 grams of n-hexane were added to the reactor. A mixture of 30.6 grams of di-n-butylether and 73.5 grams of diisoamylether was added to the moderately agitated reactor at a temperature of 35° C. Agitation continued for one hour after which the suspension was allowed to settle for five minutes. The ethers (Lewis base) to titanium molar ratio was 1.26:1.

Supernatant liquid was decanted and 100 grams of titanium tetrachloride in 56 grams of n-hexane were added with moderate agitation which was decreased after 15 minutes. The temperature was maintained at 70° C. for two hours and then cooled to 50° C. After solids were allowed to settle, supernatant liquid was decanted and a purple solid was washed 10 times with 225-milliliter portions of n-hexane. The average particle size of the resulting particles was 28.5±4.2 microns.

Comparative Run A

Reduction of titanium tetrachloride was performed as described in Example I except no propylene was added to the reactor and a mixture of 30.8 grams of di-n-butylether and 74.9 grams of diisoamylether (ethers/titanium = 1.28) was added to the washed reduced solid in the reactor, after which time the product agglomerated. Agitation was continued for an hour and after an additional hour supernatant liquid was decanted and 100 grams of titanium tetrachloride and 56 grams of n-hexane were added and the temperature increased gradually to 70° C. within 30 minutes. After 1½ hours 54.4 grams of additional titanium tetrachloride was added. The temperature was lowered to 50° C. and the resulting purple product was washed 10 times with n-hexane. The morphology of the product was agglomerated lumps.

Comparative Runs B and C

The procedure specified in Example I was followed except the amount of ethers added was 27.6 grams of di-n-butylether and 66.3 grams of diisoamylether (ethers/titanium=1.14) in Run B and 24.1 grams of di-n-butylether and 58.4 grams of diisoamylether (ethers/titanium=1.00) in Run C.

Polymerization Tests

A series of propylene polymerization tests were performed using bulk polymerization techniques. A catalyst slurry was prepared in hexane containing diethylaluminum chloride (DEAC), titanium trichloride catalyst component, bis(tributyl)tin sulfide [BTS] and collidine. The $TiCl_3$:BTS:collidine molar ratio was about 1:0.06:0.06. In an oxygen-free, water-free, two-liter stirred Parr reactor, 1,000 milliliters of propylene were added followed by addition of 1.2 milliliters of catalyst slurry containing 0.03 grams of titanium trichloride flushed with 300 milliliters of additional propylene and the reactor was pressured with 15 psig of hydrogen. The mixture was allowed to polymerize for two hours at 71° C. under vigorous agitation at 450 RPM. The resulting product was dried and analyzed by X-ray fluorescence (XRF) for titanium and aluminum content. Results for polymerization tests of the catalyst component produced in Example I, using three DEAC/$TiCl_3$ levels, and of the catalyst component produced in Runs A, B and C are given in Table I. Yields were calculated from XRF data.

TABLE 1

| Example (Run) | Polymer Content (%) (1) | [Ethers]/Ti | Al/Ti | Yield (g/g of $TiCl_3$) | Extractables (%) (2) | Bulk Density (lbs/ft$^3$) |
|---|---|---|---|---|---|---|
| I | 13.7 | 1.26 | 5.0 | 11,481 | 1.2 | 32.4 |
| I | 13.7 | 1.26 | 5.5 | 13,191 | 1.2 | 31.8 |
| I | 13.7 | 1.26 | 7.4 | 14,762 | 1.9 | 32.0 |
| A | 0 | 1.28 | 5.5 | 9,841 | 1.0 | 17.9 |
| B | 8.0 | 1.14 | 5.4 | 11,071 | 0.8 | 30.1 |
| C | 10.2 | 1.00 | 7.7 | 11,071 | 1.1 | 29.9 |

(1) Polymer content on titanium-containing catalyst component after prepolymerization.
(2) Determined by measuring loss in weight of a dry, ground polymer sample after being extracted with boiling n-hexane for six hours.

The contrast between the polymerization data for the Example and the Comparative Runs demonstrates the improvement of this invention.

We claim:

1. In a method to produce an alpha-olefin polymerization catalyst comprising reducing titanium tetrachloride with an aluminum alkyl, contacting the resulting reduced solid with a pretreatment amount of alpha-olefin monomer under polymerization conditions, and reacting the resulting product with an ether complexing agent and additional titanium tetrachloride, the improvement comprising reacting a mixture of di-n-butyl and diisoamylethers in a molar ratio to the reduced titanium compound of greater than 1.15 to 1.

2. The method of claim 1 wherein the molar ratio of ethers to titanium compound is less than about 1.5 to 1.

3. The method of claim 2 wherein the molar ratio of ethers to titanium compound is between about 1.25 to 1 and about 1.35 to 1.

4. The method of claim 1 wherein the olefin monomer is propylene, butene-1, pentene-1, hexene-1, heptene-1 or 4-methylpentene-1.

5. The method of claim 2 wherein the olefin monomer is propylene.

6. The method of claim 1 wherein the molar ratio of di-n-butylether to diisoamylether is between about 1 to 3 to about 3 to 1.

7. In a method to produce an olefin polymerization catalyst comprising reducing titanium tetrachloride with an aluminum alkyl, contacting the resulting reduced solid with a pretreatment amount of olefin monomer under polymerization conditions, and reacting the resulting product with a Lewis base complexing agent and additional titanium tetrachloride, the improvement comprising reacting a mixture of di-n-butyl and diisoamylethers in a molar ratio of ethers to reduced titanium compound greater than 1.15 to 1 and less than about 1.5 to 1 and maintaining an average particle size between about 20 to about 45 microns.

8. The method of claim 7 wherein the olefin monomer is propylene, butene-1, pentene-1, hexene-1, heptene-1 or 4-methylpentene-1.

9. The method of claim 8 wherein the molar ratio of di-n-butylether to diisoamylether is between about 1 to 3 to about 3 to 1.

10. The method of claim 8 wherein the molar ratio of ethers to titanium compound is between about 1.25 to 1 and about 1.35 to 1.

11. The method of claim 10 wherein the average particle size is between about 20 to about 45 microns.

12. The method of claim 11 wherein the average particle size is between about 30 to about 35 microns.

13. The method of claim 12 wherein the molar ratio of di-n-butylether to diisoamylether is about 1 to 2.

14. The method of claim 2 wherein the olefin monomer is butene-1.

15. The method of claim 7 wherein the olefin monomer is propylene.

16. The method of claim 7 wherein the olefin monomer is butene-1.

* * * * *